July 17, 1923.
W. C. SHANLEY
DEVICE FOR CONNECTING SUCTION PIPES TO TANKS AND OTHER RECEPTACLES
Filed Feb. 21, 1921
1,461,945
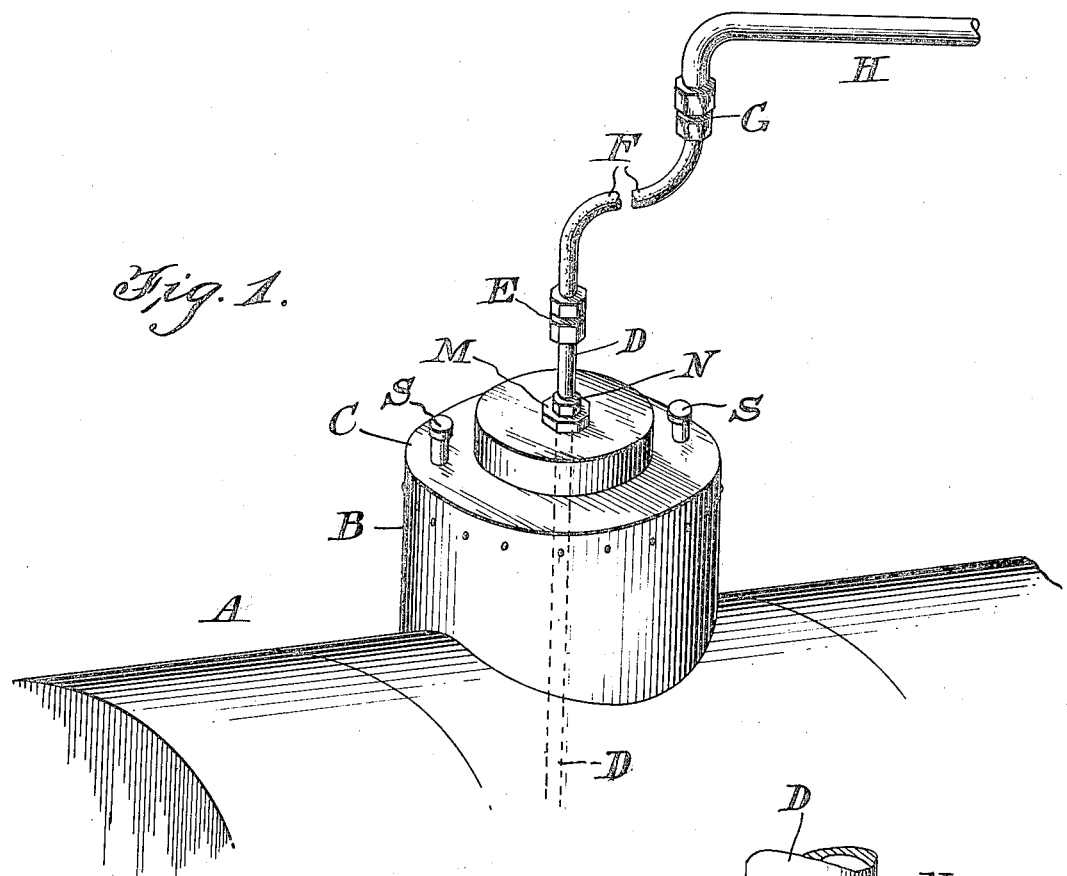
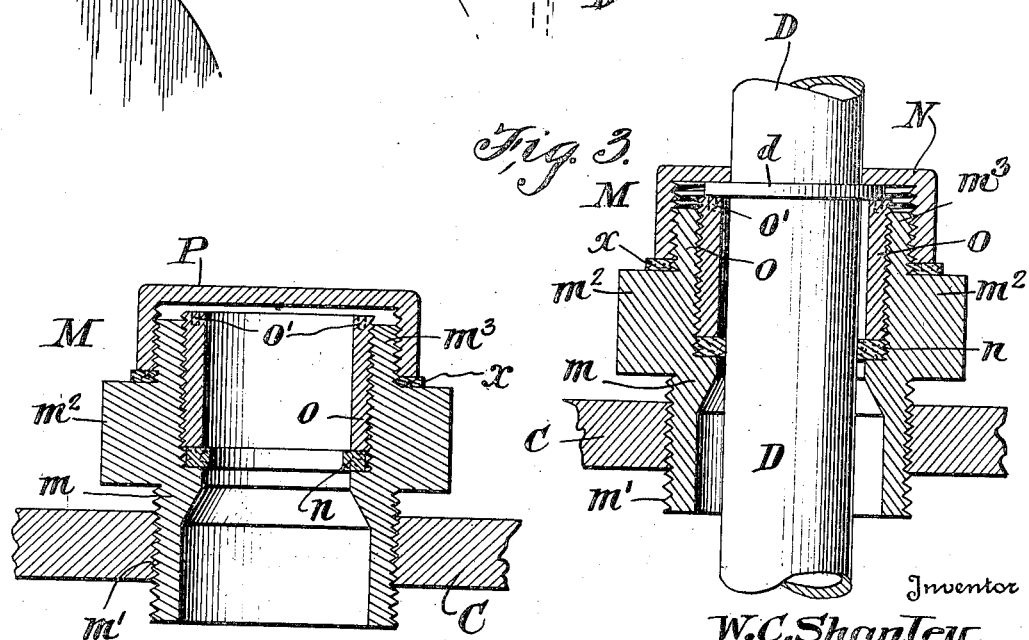

Patented July 17, 1923.

1,461,945

UNITED STATES PATENT OFFICE.

WILLIAM C. SHANLEY, OF DES MOINES, IOWA.

DEVICE FOR CONNECTING SUCTION PIPES TO TANKS AND OTHER RECEPTACLES.

Application filed February 21, 1921. Serial No. 446,651.

*To all whom it may concern:*

Be it known that I, WILLIAM C. SHANLEY, a citizen of the United States, residing at Des Moines, in the county of Polk and State of Iowa, have invented certain new and useful Improvements in Devices for Connecting Suction Pipes to Tanks and Other Receptacles, of which the following is a specification.

This invention relates to devices for supporting a pipe in the man-hole or opening of a tank or other receptacle containing a liquid, and particularly to means for supporting a suction pipe in the man-hole or dome of a tank car.

An important feature of the invention is in so connecting the suction pipe with the tank that while being properly supported, the pipe has a fireproof connection with the tank so that inflammable gases cannot easily pass through the device and flame cannot enter.

It is common practice to unload tank cars by means of a suction pipe through the man-hole of the tank dome and heretofore in practice such tanks have not been provided with means for preventing the escape of inflammable gases.

According to my invention I provide a hollow gland which has a threaded connection with the top of the dome of the tank, and which is of such form that the suction pipe may be readily passed through it. The gland contains packing material within it, and on its outside, and it is engaged by a cap having a central opening through it to receive the suction pipe. This pipe is provided with a collar against which the cap bears when the pipe is in position in the gland. When the pipe is withdrawn from the tank, the cap, after being unscrewed, is withdrawn with the pipe and always remains thereon in position ready to be attached to the gland when required. After the pipe is withdrawn with the cap, the opening through the gland may be closed by a tightly fitting cover for that purpose.

In the accompanying drawings:—

Figure 1 is a perspective view showing how my improvements are applied to the dome of a tank car.

Figures 2 and 3 are on an enlarged scale.

Figure 2 shows the coupling gland applied to the man-hole of the dome, the gland being closed by a cover used during transport.

Figure 3 is a sectional view showing how the gland supports a suction pipe when the tank car is at an unloading station.

I have shown my improvements applied to a tank car A having a dome B and a manhole covered by a cap C. A suction pipe D is connected by couplings E to a flexible pipe or hose F secured by couplings G to a pipe H leading to a receiver for the liquid withdrawn from the tank.

In order to support the suction pipe on the dome and to provide a fireproof connection therewith, I provide a gland M comprising a body portion $m$ having a threaded connection $m'$ with the cover C and having also an angular part $m^2$ to which a wrench may be applied and an upper threaded portion $m^3$ adapted to receive a cap N. The cap has a central opening through which the suction pipe extends. S indicates vents.

The body of the gland is threaded interiorly at $o$ to receive a threaded sleeve O which holds in place packing $n$ surrounding the suction pipe. The sleeve is formed with holes $o'$ in its upper edge to receive projections on a wrench by means of which the sleeve may be screwed into place in the body of the gland in such manner as to hold the packing $n$ firmly in position. The suction pipe is adapted to extend to the bottom of the tank and it is held in proper position by a collar $d$ on the pipe which is adapted to rest on the top of the sleeve O. The cap N, which has a threaded connection with the part $m^3$ of the gland, bears upon the collar $d$ and holds it firmly pressed against sleeve O. The cap also bears at its edge on packing $x$ supported by the body of the gland. When the parts are thus assembled, as shown in Fig. 3, the pipe is properly supported and there is no possible chance for escape of gas or for the entrance of flame into the tank. When the tank is emptied, the cap N may be loosened and withdrawn from the gland and the suction pipe withdrawn from the car. The crane or other means for raising the suction pipe forms no part of my present invention. After the pipe has been thus withdrawn from the tank, the opening through the gland is closed by a cap P having a threaded connection with the upper portion $m^3$ of the gland. This pipe has no openings through it and, therefore, the gland is tightly closed and the tank is in condition for transport. When the tank is again filled, the gland is closed by a cap P and when the car arrives at an unloading station, the cover P is removed, a suction pipe is inserted through the gland and the cap N which it carries is secured to the gland in the manner before described.

I claim as my invention:

1. The combination with a suction pipe of a gland for connecting the pipe with a receptacle, comprising a threaded body portion adapted to be secured to the receptacle and having an internally threaded chamber, a threaded sleeve adapted to engage the internally threaded part of the gland, packing held in place within the gland by the sleeve, a cap through which the suction pipe extends and which has a threaded engagement with the gland and packing held in place on the gland by the cap.

2. The combination with a suction pipe provided with a collar of a gland for connecting the pipe with a receptacle, comprising a hollow body portion threaded at its inner end to connect with the receptacle and having an outer portion threaded internally and externally, a threaded sleeve within the body portion of the gland and engaging the internal thread thereof, packing held within the gland by the sleeve, and a cap for the gland through which the pipe extends and which holds the collar on the sleeve, and packing interposed between the cap and the body of the gland.

3. The combination with a suction pipe carrying a collar of a gland for connecting the pipe with a receptacle, comprising a hollow body portion threaded at one end externally to engage with the receptacle and threaded, also at its opposite end both externally and internally and formed within with an annular shoulder between its opposite ends, a sleeve within the body portion of the gland and having a threaded engagement therewith, packing interposed between the inner end of the sleeve and said shoulder, a cap through which the pipe extends which forces the collar of the pipe against the outer end of the sleeve and which has a threaded engagement with the gland, and packing interposed between the collar and the gland.

In testimony whereof I have hereunto subscribed my name.

WILLIAM C. SHANLEY.